United States Patent
Behl et al.

Patent Number: 5,458,995
Date of Patent: Oct. 17, 1995

[54] SOLID STATE ELECTROCHEMICAL CELL INCLUDING LITHIUM IODIDE AS AN ELECTROLYTE ADDITIVE

[75] Inventors: Wishvender K. Behl, Ocean; Edward J. Plichta, Howell, both of N.J.

[73] Assignee: The United States of America as represented by the Secretary of the Army, Washington, D.C.

[21] Appl. No.: 425,568

[22] Filed: Apr. 20, 1995

Related U.S. Application Data

[63] Continuation-in-part of Ser. No. 291,797, Aug. 12, 1994.

[51] Int. Cl.$^6$ .................................................... H01M 6/18
[52] U.S. Cl. ............................ 429/193; 429/191; 429/218
[58] Field of Search .................................... 429/191, 193, 429/218

[56] References Cited

U.S. PATENT DOCUMENTS

| | | | |
|---|---|---|---|
| 4,525,440 | 6/1985 | Barnette et al. | 429/191 |
| 5,273,846 | 12/1994 | Plichta et al. | 429/193 |
| 5,273,847 | 12/1994 | Plichta et al. | 429/193 |

Primary Examiner—Stephen Kalafut
Assistant Examiner—Richard H. Lilley, Jr.
Attorney, Agent, or Firm—Michael Zelenka; William H. Anderson; Roy E. Gordon

[57] ABSTRACT

An improved solid state electrochemical cell is provided including a lithium ion conducting solid electrolyte. The lithium ion conducting solid electrolyte is a solid solution of lithium germanium oxide and lithium vanadium oxide that includes lithium iodide as an additive. The improved cell can be used as a high temperature high rate rechargeable cell or as a high temperature thermal cell.

7 Claims, 4 Drawing Sheets

| CURRENT DENSITY (A/cm$^2$) | CATHODE CAPACITY (F/MOLE TiS$_2$) | AVERAGE VOLTAGE, V |
|---|---|---|
| 0.1 | 0.41 | 1.35 |
| 0.2 | 0.40 | 1.03 |
| 0.3 | 0.23 | 0.97 |
| 0.5 | 0.19 | 0.86 |

FIG. 6

| ANODE | ELECTROLYTE | DISCHARGE TIME (Sec) | AVERAGE VOLTAGE, V | CATHODE CAPACITY (F/mole TiS$_2$) |
|---|---|---|---|---|
| LiAl | Li$_{3.6}$Ge$_{0.6}$V$_{0.4}$O$_4$ | 27 | 1.02 | 0.14 |
| LiSi | Li$_{3.6}$Ge$_{0.6}$V$_{0.4}$O$_4$ | 25 | 0.88 | 0.13 |
| LiAl | 50wt% LiI In Li$_{3.6}$Ge$_{0.6}$V$_{0.4}$O$_4$ | 81 | 1.38 | 0.42 |
| LiSi | 50wt% LiI In Li$_{3.6}$Ge$_{0.6}$V$_{0.4}$O$_4$ | 90 | 1.72 | 0.47 |

SOLID STATE ELECTROCHEMICAL CELL INCLUDING LITHIUM IODIDE AS AN ELECTROLYTE ADDITIVE

GOVERNMENT INTEREST

The invention described herein may be manufactured, used, and licensed by or for the Government for governmental purposes without the payment to us of any royalties thereon.

CONTINUATION IN PART

This patent application is a continuation-in-part of U.S. patent application Ser. No. 08/291,797 filed Aug. 12, 1994 by Wishvender K. Behl and Edward J. Plichta for "IMPROVED SOLID STATE ELECTROCHEMICAL CELLS AND ELECTROLYTE FOR SAID CELLS".

FIELD OF INVENTION

The invention relates to improved solid state electrochemical cells and to a solid state electrolyte for use in the cells.

BACKGROUND OF THE INVENTION

Certain solid state electrochemical cells such as high temperature rechargeable lithium electrochemical cells are known that use a solid solution of lithium germanium oxide ($Li_4GeO_4$) and lithium vanadium oxide ($Li_3VO_4$) as the lithium ion conducting solid electrolyte. The solid electrolyte can be represented by the general formula $Li_{3+x}Ge_xV_{1-x}O_4$ where x is a value from 0 to 1. The conductivity of the solid solution, $Li_{3.6}Ge_{0.6}V_{0.4}O_4$ is about 0.08 S/cm at 300° C. and the solid solution has been used as a lithium ion conducting solid electrolyte for solid state cells. However, these high conductivities are achieved with sintered pellets of the solid electrolyte that are difficult to fabricate. The conductivities of the easily fabricated pressed pellets of the solid electrolyte are much smaller than the conductivities of the sintered pellets so that the cells fabricated with pressed pellets of the solid electrolyte do not deliver the high discharge rates required for pulse power applications.

The use of these lithium ion conducting solid electrolytes has also been suggested for other electrochemical cells as for example, high temperature thermal cells. These cells are required for applications in fuses, projectile rockets, bombs, missiles, decoys, jammers and torpedoes. However, in this case too, cells fabricated with pressed pellets of the solid electrolyte do not deliver the required high discharge rates.

SUMMARY OF THE INVENTION

The general object of this invention is to provide a solid state electrochemical cell that can be operated at high temperatures of 300° to 400° C. A more particular object of the invention is to provide such an electrochemical cell that can be operated as a high temperature thermal cell or high rate rechargeable cell having excellent cycle life, component stability and low cost. A particular object of the invention is to provide such a system that can deliver high discharge rates using pressed pellets of the solid electrolyte.

It has now been found that the aforementioned objects can be attained by using mixtures of $Li_{3.6}Ge_{0.6}V_{0.4}O_4$ and lithium iodide (LiI) as the lithium ion conducting solid electrolyte. The conductivities of the pressed pellets of these mixtures approach the conductivities of sintered pellets of $Li_{3.6}Ge_{0.6}V_{0.4}O_4$ so that the solid state cells fabricated with these pressed pellets can be discharged at rates up to 0.5 A/cm². More particularly, the aforementioned objects can be attained by providing a high temperature rechargeable lithium solid state cell or a high temperature thermal cell including a titanium disulfide cathode, a lithium-silicon alloy (48 weight percent lithium) anode, and a lithium ionically conducting solid electrolyte including 50:50 weight percent mixtures of $Li_{3.6}Ge_{0.6}V_{0.4}O_4$ and LiI additive and operated at elevated temperatures. The LiSi/$Li_{3.6}Ge_{0.6}V_{0.4}O_4$ LiI/$TiS_2$ solid state cell can produce the desired results when operated at temperatures of 300° to 400° C.

DESCRIPTION OF THE DRAWING AND THE PREFERRED EMBODIMENT

FIG. 6 summarizes discharge time average cell voltage and cell capacities at a discharge rate of 30 milliampres per square centimeter.

Figures 1, 5:
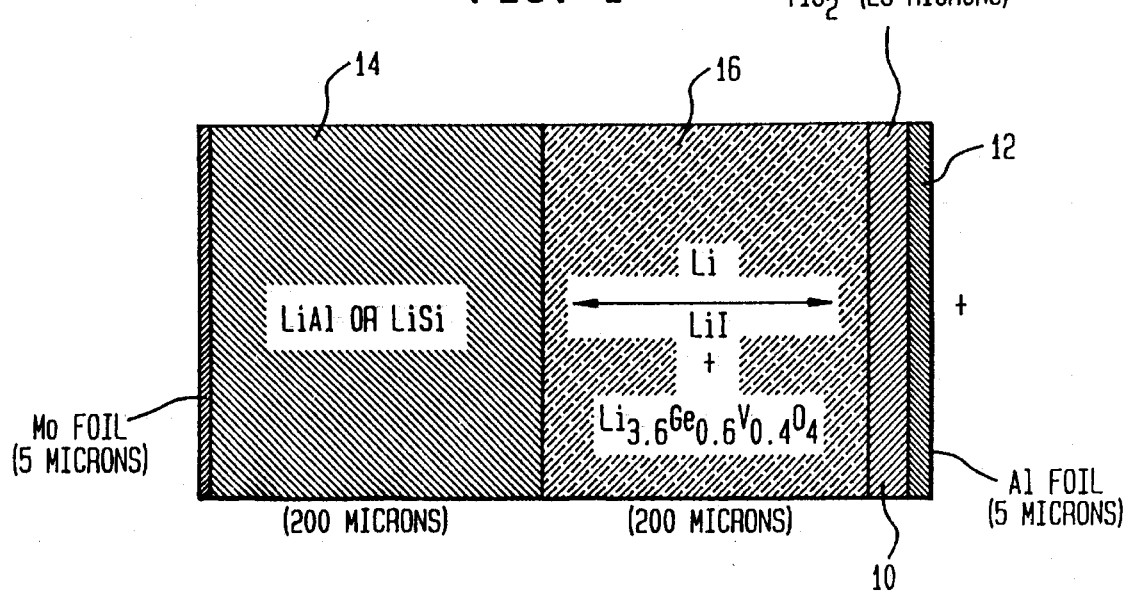
FIG. 1 shows a schematic diagram of a rechargeable cell stack.
FIG. 5 summarizes the average cell voltages and cell capacities at various discharge rates.

Referring to FIG. 1, a cathode 10 is prepared by thin film deposition of $TiS_2$ onto an aluminum metal foil current collector 12 in which the cathode active material has a thickness of 25 microns. The films have a calculated porosity of about 20 percent and a coulombic capacity of 5.8 C/cm². The surface area of the cathode 10, is 0.3 cm² resulting in a theoretical cathode capacity of 0.48 mA/cm² based on 1 F/mole of $TiS_2$. An anode pellet, 14, is prepared by pressing an about 0.03 gram sample of lithium-silicon alloy (48 weight percent lithium) powder in a 1.3 cm steel die at a pressure of about 1800 kgs.

The $Li_{3.6}Ge_{0.6}V_{0.4}O_4$ solid electrolyte is prepared by high temperature synthesis from an intimate mixture of 1.33 grams of lithium carbonate, $Li_2CO_3$, 0.628 gram of germanium oxide, $GeO_2$, and 0.364 gram of vanadium oxide, $V_2O_5$. The mixture is pressed into a pellet and heated in air at 600° C. for 2 hours followed by heating at 900° C. in air for about 20 hours. The $Li_{3.6}Ge_{0.6}V_{0.4}O_4$ compound prepared is a specific solid solution of lithium germanium oxide, $Li_4GeO_4$, and lithium vanadium oxide, $Li_3VO_4$, in which a range of solid solution exists between a composition of 15 and 75 mole percent of $Li_4GeO_4$ in $Li_3VO_4$. The solid solution $Li_{3.6}Ge_{0.6}V_{0.4}O_4$ can also be prepared by mixing requisite amounts of (40 mole percent) $Li_3VO_4$ and $Li_4GeO_4$ (60 mole percent) and heating the mixture to 900° C. in air for 10–12 hours. That is, the 0.05 gm sample of electrolyte, 16, a 50:50 weight percent mixture of $Li_{3.6}Ge_{0.6}V_{0.4}O_4$ and LiI is then evenly spread on top of the pressed anode, 14, and further pressed at a force of about 4500 kgs. The thicknesses of both the anode, 14, and the electrolyte, 16, are about 200 microns each.

The cells are assembled by stacking the titanium disulfide film on top of the anode, 14, and electrolyte, 16, and placing the cell stack between two molybdenum current collectors. The cell stack is held in compression through the use of a spring loaded assembly and operated in a sealed pyrex vessel under a flowing argon atmosphere.

Figure 2:
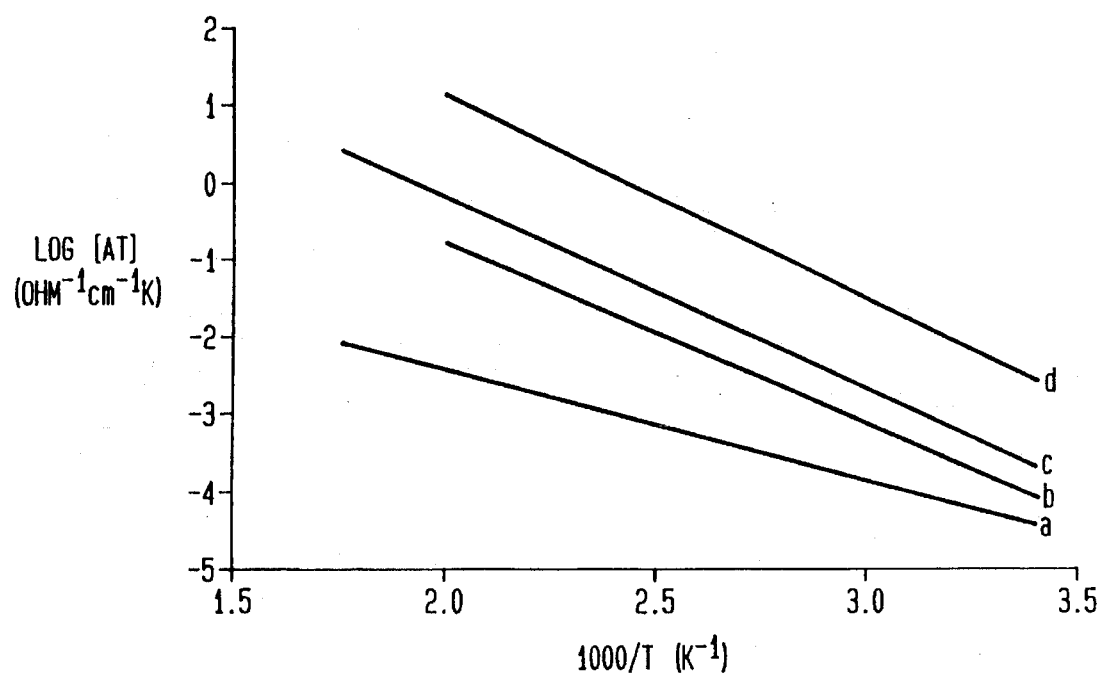
FIG. 2 shows the conductivities of the unsintered pressed pellets of the solid electrolyte, $Li_{3.6}Ge_{0.6}V_{0.4}O_4$ as a function of temperatures up to 300° C.
Figure 3:
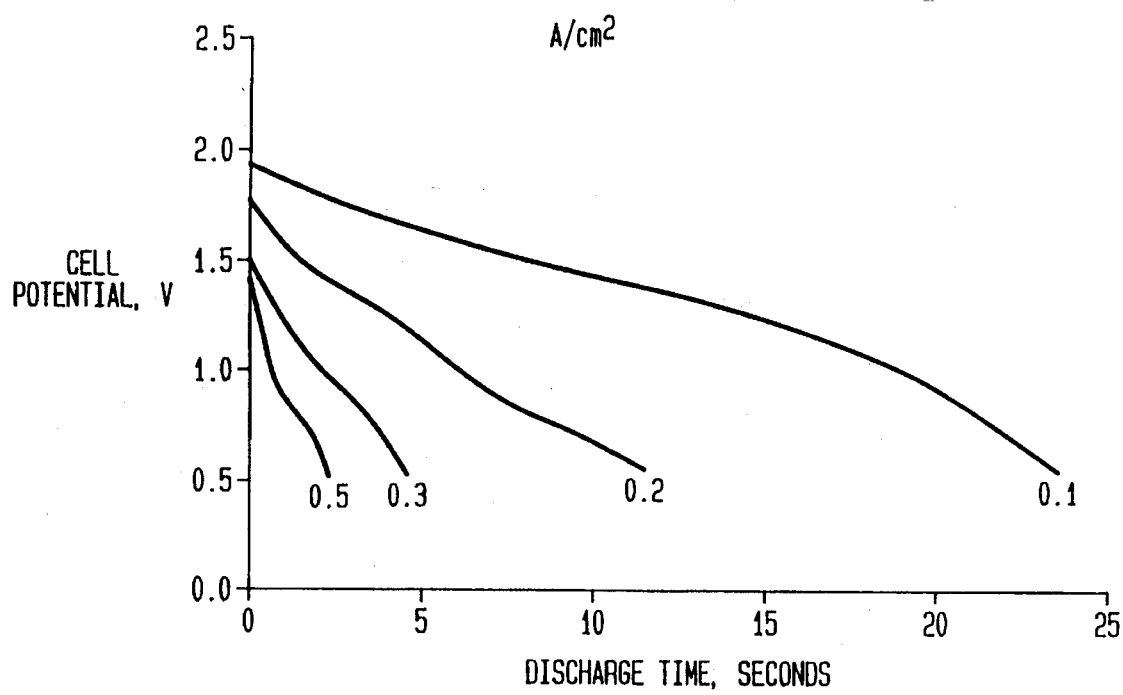
FIG. 3 shows typical discharge curves obtained with the rechargeable cell, LiSi/$Li_{3.6}Ge_{0.6}V_{0.4}O_4$—LiI/$TiS_2$ at current densities of 0.1 to 0.5 A/cm² at about 300° C.

Referring to FIG. 2, there are shown Arrhenius plots of conductivity for unsintered pressed pellets of $Li_{3.6}Ge_{0.6}V_{0.4}O_4$(a), 50:50 weight percent $Li_{3.6}Ge_{0.6}V_{0.4}O_4$—LiI(c) LiI(b) and sintered pellets of $Li_{3.6}Ge_{0.6}V_{0.4}O_4$(d). The conductivities of pressed $Li_{3.6}Ge_{0.6}V_{0.4}O_4$ solid electrolyte are found to be much smaller than the literature conductivities of the sintered pellet solid electrolyte shown in FIG. 2. However, due to the experimental difficulties involved in preparing thin (~200 μm) sintered electrolyte pellets for a high rate cell, applicants have attempted to improve the conductivities of the pressed pellets by the use of additives such as lithium iodide. The conductivities of pressed pellets of $Li_{3.6}Ge_{0.6}V_{0.4}O_4$—LiI (50:50 weight percent) mixtures are plotted in FIG. 2 along with the literature conductivities of lithium iodide and $Li_{3.6}Ge_{0.6}V_{0.4}O_4$ electrolytes. It has been found that the conductivities of $Li_{3.6}Ge_{0.6}V_{0.4}O_4$—LiI pellets are substantially higher than the conductivities of the pure $Li_{3.6}Ge_{0.6}V_{0.4}O_4$ or LiI pellets and approach the conductivities obtained with sintered $Li_{3.6}Ge_{0.6}V_{0.4}O_4$ pellets. The $Li_{3.6}Ge_{0.6}V_{0.4}O_4$—LiI pellets are found to be dense and compact. This contributes to the enhancement in conductivity of the resulting pellets.

According to the invention, a high temperature electrochemical lithium solid state cell includes a titanium disulfide cathode and a lithium ionically conducting solid electrolyte of 50:50 weight percent mixture of $Li_{3.6}Ge_{0.6}V_{0.4}O_4$ and LiI. The cell is operated at elevated temperatures. The cell can produce the desired results when operated at temperatures of 300° to 400° C.

The solid state thermal electrochemical cell includes a $TiS_2$ cathode prepared by thin film deposition of $TiS_2$ onto an aluminum metal foil current collector, a lithium-silicon alloy (48 wt % lithium) anode pellet prepared by pressing the alloy powder in a 1.3 cm steel die at a force of 1800 kgs and a solid electrolyte pellet prepared by pressing a 50:50 weight percent mixture of $Li_{3.6}Ge_{0.6}V_{0.4}O_4$ and LiI in a steel die at a force of 4500 kgs. The cell stack is held in compression between two molybdenum plates by the use of a spring loaded assembly and operated in a sealed pyrex vessel under a flowing argon atmosphere.

In discharge, lithium ions are generated at the lithium alloy electrode and transported through the solid electrolyte and intercalated into the titanium disulfide cathode. The total cell reaction may be represented as:

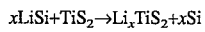
$$xLiSi+TiS_2 \rightarrow Li_xTiS_2+xSi$$

where x represents the fraction of lithium intercalated into the titanium disulfide cathode.

Figure 4:
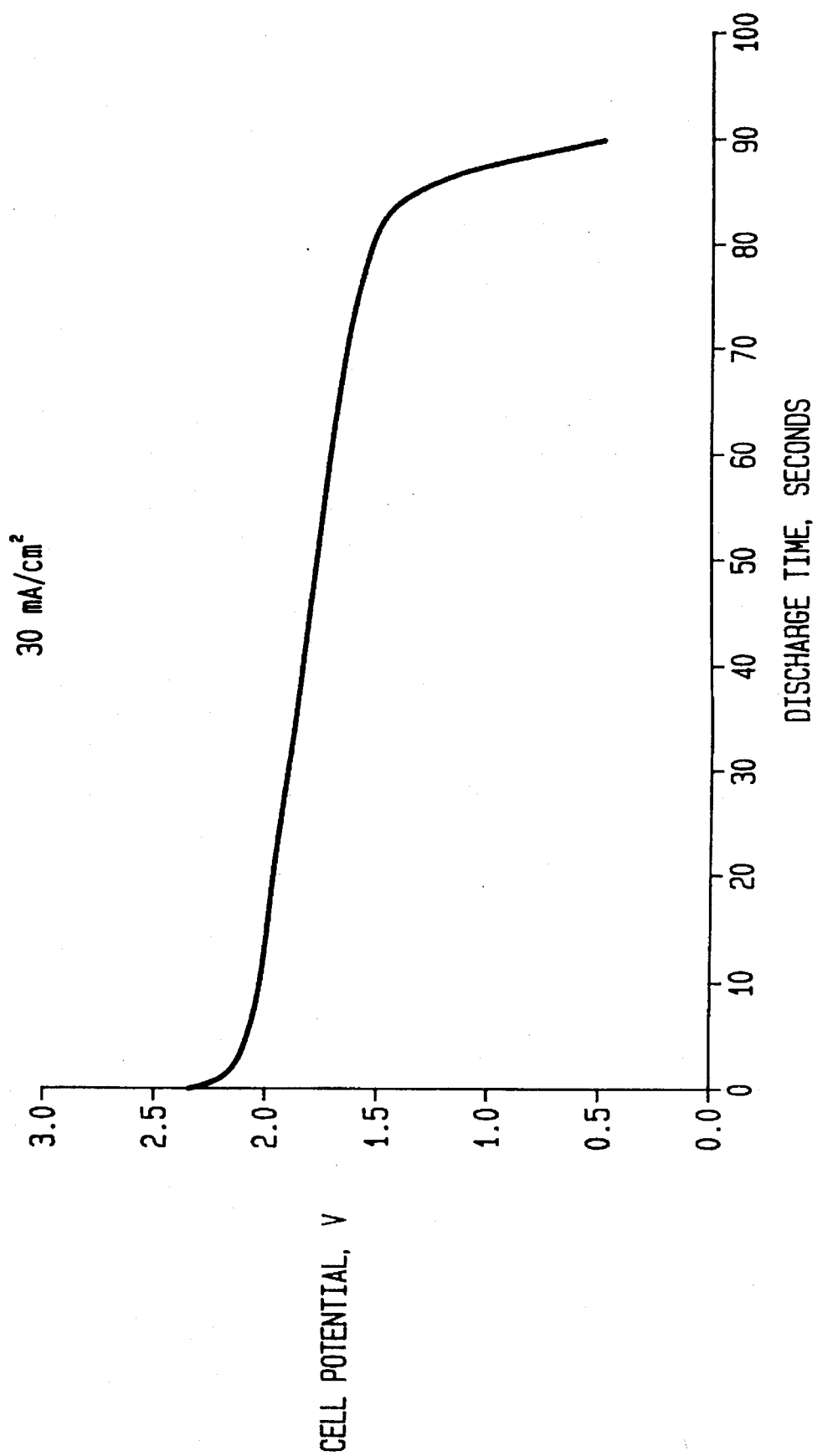
FIG. 4 shows a discharge curve for the high temperature thermal cell LiSi/$Li_{3.6}Ge_{0.6}V_{0.4}O_4$—LiI/$TiS_2$ at a current density of 30 mA/cm².

FIG. 4 shows a discharge curve for the thermal cell LiSi/$Li_{3.6}Ge_{0.6}V_{0.4}O_4$—LiI/$TiS_2$ at a current density of 30 mA/cm². The discharge times, average discharge voltages of the cell at a current density of 30 mA/cm² using LiAl or LiSi anode and with and without the lithium iodide additive in the solid electrolyte are summarized in FIG. 6. The cells exhibit a threefold increase in discharge time and higher average voltages when the lithium iodide is included in the solid electrolyte compared to cells without the lithium iodide additive.

The thermal cell, Li—Si/$Li_{3.6}Ge_{0.6}V_{0.4}O_4$—LiI/$TiS_2$ can be discharged at current densities up to 0.5 A/cm² and the average cell voltages at current densities of 0.1, 0.2, 0.3 and 0.5 A/cm² are found to be 1.35, 1.03, 0.97 and 0.86 respectively. In thermal cells without the lithium iodide additive in the solid electrolyte, the mid discharge cell voltages fall below 1.0 volt at current densities in excess of 0.05 A/cm² whereas the mid discharge cell voltages in thermal cells using $Li_{3.6}Ge_{0.6}V_{0.4}O_4$—LiI mixtures as the lithium ion conducting solid electrolyte remains above 1.0 volt at current densities up to 0.2 A/cm² and represents a marked improvement over the previous cells employing $Li_{3.6}Ge_{0.6}V_{0.4}O_4$ solid electrolyte without the lithium iodide additive.

The high temperature thermal electrochemical cells of this invention are distinguishable from the high temperature rechargeable electrochemical cells in that the thermal cells are used one time and are activated by a pyrotechnic source and do not require an external heater to maintain and control the temperature as is required in the case of rechargeable cells. Moreover, the thermal cells can be stored over a long period of time without deterioration of materials or loss of power.

Other possible cathode materials that can be substituted for $TiS_2$ include $FeS_2$, $COS_2$, $NiS_2$, $LiCoO_2$, $LiNiO_2$, $LiMnO_2$, $V_6O_{13}$, $V_2O_5$, $MoS_2$, $MoS_3$, $NbSe_3$, $VSe_2$, $AgF$, $CuF_2$, $CuCl_2$, $NiF_2$ as well as other transition metal halides, chalcogenides, selenides, tellurides and oxides. Other possible anode materials include LiAl, LiB, $LiC_6$, $LiTiS_2$, $LiVSe_2$, as well as other lithium containing compounds suitable for use as an anode. Other possible electrolyte compositions that can be substituted for $Li_{3.6}Ge_{0.6}V_{0.4}O_4$ include other solid solutions of $Li_{3.6}Ge_{0.6}V_{0.4}O_4$ and their mixtures with LiI. The percentage of lithium iodide in these mixtures may also be varied from 0 to 100 percent.

We wish it to be understood that we do not desire to be limited to the exact details of construction shown and described for obvious modifications will occur to a person skilled in the art.

What is claimed is:

1. An improved solid state electrochemical cell including an alloy of lithium as an anode, a solid solution of lithium germanium oxide and lithium vanadium oxide as a lithium ion conducting solid electrolyte and wherein said solid electrolyte also includes an additive that improves the conductivity of the electrolyte, and a lithium intercalating compound as a cathode.

2. An improved solid state electrochemical cell according to claim 1 wherein the lithium alloy is selected from the group consisting of LiAl, LiSi, LiB, wherein the lithium ion conducting solid electrolyte is a solid solution of lithium germanium oxide and lithium vanadium oxide including LiI as an additive that improves the conductivity of the electrolyte, and wherein the cathodic intercalating compound is a compound selected from the group consisting of transition metal halides, transition metal chalcogenides, transition metal selenides, transition metal tellurides and transition metal oxides.

3. An improved solid state electrochemical cell according to claim 2 where the anode is a lithium silicon alloy of about 48 weight percent lithium, wherein the solid electrolyte is represented by the general formula $Li_{3+x}Ge_xV_{1-x}O_4$ where x has a value of from 0 to 1 and wherein the solid electrolyte includes 0 to 100 percent of the weight of the solid electrolyte of LiI as an additive that improves the conductivity of the electrolyte, and wherein the cathodic intercalating compound is selected from the group consisting of $TiS_2$, $FeS_2$, $CoS_2$, $NiS_2$, $LiCoO_2$, $LiNiO_2$, $LiMnO_2$, $V_6O_{13}$, $V_2O_5$, $MoS_2$, $MoS_3$, $NbSe_3$, $VSe_2$, $AgF$, $CuF_2$, $CuCl_2$, $CuCl$, and $NiF_2$.

4. An improved solid state electrochemical cell comprising lithium-silicon as the anode, a mixture of $Li_{3.6}Ge_{0.6}V_{0.4}O_4$ and LiI as the electrolyte, and $TiS_2$ as the cathode.

5. A solid state electrolyte for use in a lithium electrochemical cell, said solid state electrolyte including a solid solution of lithium germanium oxide and lithium vanadium oxide, the solid state electrolyte also including an additive that is chemically stable in the presence of lithium and lithium containing anode materials.

6. A solid state electrolyte according to claim 5 wherein the additive is LiI.

7. A solid state electrolyte according to claim 6 wherein the solid electrolyte is represented by the general formula $Li_{3+x}Ge_xV_{1-x}O_4$ and, wherein where x varies from 0 to 1.

* * * * *